United States Patent [19]

Ornum et al.

[11] 4,426,468

[45] Jan. 17, 1984

[54] SEALANT COMPOSITION

[75] Inventors: Joel V. Ornum, Kirkland; Jessie T. Chiu, Bellevue, both of Wash.

[73] Assignee: Rockcor, Inc., Redmond, Wash.

[21] Appl. No.: 413,197

[22] Filed: Aug. 30, 1982

Related U.S. Application Data

[63] Continuation of Ser. No. 298,137, Aug. 31, 1981, abandoned, which is a continuation of Ser. No. 156,125, Jun. 3, 1980, abandoned, which is a continuation of Ser. No. 949,451, Oct. 10, 1978, abandoned.

[51] Int. Cl.³ .............................................. C08L 23/22
[52] U.S. Cl. .................... 523/166; 152/347; 152/348; 524/420; 524/423; 524/424; 524/432; 524/433; 524/437; 524/444; 524/445; 524/456; 524/508; 524/511; 524/525; 524/574
[58] Field of Search .............. 524/574, 508, 511, 525, 524/432, 437, 420, 445, 423, 456, 444, 433, 424; 523/166; 152/348, 347

[56] References Cited

U.S. PATENT DOCUMENTS

| | | | |
|---|---|---|---|
| 2,566,384 | 9/1951 | Tilton, Jr. | 152/347 |
| 2,619,481 | 11/1952 | Baldwin et al. | 525/333 |
| 2,702,287 | 2/1955 | Iknayan et al. | 524/511 |
| 2,756,801 | 7/1956 | Iknayan et al. | 152/347 |
| 2,765,018 | 10/1956 | Connell | 152/347 |
| 2,776,699 | 1/1957 | Kindle et al. | 154/14 |
| 2,782,829 | 2/1957 | Peterson et al. | 152/347 |
| 2,905,220 | 9/1959 | Schutz | 152/330 |
| 3,595,942 | 7/1971 | Wald et al. | 525/332.9 |
| 3,769,122 | 10/1973 | Coddington et al. | 152/347 |
| 3,816,371 | 6/1974 | Baldwin et al. | 525/282 |
| 3,935,893 | 2/1976 | Stang et al. | 152/347 |

FOREIGN PATENT DOCUMENTS 2639391  2/1978  Fed. Rep. of Germany ...... 523/166

*Primary Examiner*—Lewis T. Jacobs
*Attorney, Agent, or Firm*—Dowrey & Cross

[57] ABSTRACT

A sealant composition particularly suitable for vehicle tires comprising a cured butyl rubber present only in the form of a copolymer having a molecular weight in excess of 100,000 and one or more tackifiers, the tensile strength, elongation and cross-link density of the composition being adjusted to produce the necessary properties for tire sealants.

19 Claims, 2 Drawing Figures

SEALANT COMPOSITION

This application is a continuation of application Ser. No. 298,137, filed Aug. 31, 1981, which is a continuation of application Ser. No. 156,125, filed June 3, 1980, which is a continuation of application Ser. No. 949,451, filed Oct. 10, 1978, all are now abandoned.

FIELD OF THE INVENTION

The sealant composition of this invention was developed as a self-healing tire puncture sealant. As a tire sealant, it is adapted for application to the internal surface of a rubber tire and is intended to seal puncture holes in the tread region under widely varying temperature conditions. Being suitable as a tire sealant, the sealant composition of this invention is applicable to other, similar as well as less severe uses.

BACKGROUND OF THE INVENTION

To be suitable for sealing tire punctures, a sealant composition must meet a unique and exceptionally demanding set of physical and chemical criteria. It must be resistant to aging, decomposition and flow at the high temperatures to which tires are heated under summertime driving conditions. In the case where the puncturing object remains in the tread while the tire continues to be used, the sealant must have sufficient tack and fatigue resistance to remain adhered to the object even as it works back and forth during tire revolution. In the case where the puncture object is removed from the tread, the sealant must be capable of flowing into the puncture hole at wintertime temperatures and sealing it. Further properties required of a tire sealant are discussed in greater detail below.

Because butyl rubber has low air permeability, high resistance to aging and an easily controlled cross-linked density, the prior art has attempted to utilize butyl rubber as a basic compound of tire sealants. One approach, exemplified by U.S. Pat. Nos. 2,756,801, 2,765,018 and 2,782,829, has been to utilize a single grade of butyl rubber to form the sealant network, and to add tackifiers, plasticizers and other more specialized ingredients such as phenols or iron oxide in an attempt to achieve the necessary balance of physical properties. Compositions based on such patents, however, have not achieved widespread acceptance, primarily because such sealants have failed to perform satisfactorily at the temperature extremes (e.g. −20° F. to 220° F.) to which tires are subjected.

A second approach to butyl rubber based tire sealants has utilized a combination of high and low molecular weight buty rubber grades cross-linked together to form a single elastomeric network. Such sealants have been found to perform quite well over wide temperature ranges. However low molecular weight butyl rubber is less readily available commercially than the high weight variety, and sealants based in part on low molecular weight butyl are therefore less attractive.

One of the main difficulties in developing an acceptable tire sealant composition is that a single physical property of such a composition can depend on a great variety of chemical variables. Thus in a sealant composition generally comprising a cured, reinforced butyl rubber and a tackifier, a single property such as tensile strength will depend on the fraction of butyl rubber present, the molecular weight and mole percent unsaturation of the butyl rubber, the amount of cross-linking agent used, the amount of reinforcing agent used, and to a certain extent on the tackifiers and on the curing and application techniques employed. Under these circumstances, it is difficult to specify unique ranges for individual chemical variables, since the overall physical properties of interest depend on the combine effect of many variables. For example it has been found that compositions in which the fraction of butyl rubber present lies within a certain range may be formulated having desirable tensile properties. Yet it may well be possible to reproduce such properties outside such range by adjusting the amount of cross-linking agent used and other variables.

SUMMARY OF THE INVENTION

Applicants have discovered that superior sealant compositions can be formulated by adjusting the compositions so that three key properties are controlled. These three properties are tensile strength, elongation and cross-link density. Tensile strength refers to the maximum stress (force per unit area) that a specimen of sealant material can withstand before rupturing. Elongation measures the relative increase in length of a specimen of material at the point of rupture. Cross-link density is a molecular property which measures the concentration of crossl-links present in that part of the sealant which has been cured into a three dimensional cross-linked network. It is most conveniently measured by a swell test which determines the amount of solvent that the three dimensional network present in a given specimen of sealant will absorb.

These three properties—tensile strength, elongation and cross-link density—are important because of their relationship to the properties that a tire sealant must have in order to perform properly. If the tensile strength of a sealant is too low, the sealant will flow under typical tire operating conditions and will also "blow through" a puncture hole when a puncturing object is removed from the tire and fail to seal the hole. An acceptable sealant must therefore be formulated with sufficient tensile strength to withstand such a "blow through".

If the elongation of a sealant is too low, it will have several defects. When an object such as a nail enters a tire whose interior is coated with a sealant composition, the sealant should preferably adhere to the nail and form a tent-like structure surrounding it. Adhesion of the sealant to the nail at this time will assist in preserving an air barrier at the puncture and will also result in the sealant being drawn by the nail into the puncture hole as the nail is removed. If the sealant has insufficient elongation, it will be unable to stretch enough to form a tent. The sealant may then "cap" the nail, i.e., a small portion of sealant surrounding the tip of the nail will break away from the remainder of the sealant and remain adhered to the nail near its tip. Capping generally results in poor nail-in sealing performance. A further result of low elongation will be that in the case of a large puncture, not enough sealant will be able to flow over and into the hole to effect a seal when the puncturing object is removed.

The cross-link density of a polymeric sealant determines how strongly the sealant will resist permanent deformation. If the sealant has too high a cross-link density, it will be too resistant to permanent deformation, and the sealant will cap a puncturing object rather than form a tent, with the results described above. If the cross-link density is too low, centrifugal force will cause the sealant to creep or flow at elevated temperatures, resulting in insufficient sealant underlying the shoulder portion of the tire. Too low a cross-link density will also result in a low fatigue resistance for the sealant composition. Fatigue resistance is an important requirement for an effective tire sealant, most particularly in the situation where an object such as a nail enters a tire, and the tire is then used for a considerable time without the nail being removed. In a typical case, of course, a motorist will not even be aware of the nail's presence. Periodic contact between the punctured portion of the tire and the road will result in the nail flexing back and forth as the tire rotates. Assuming that the sealant has formed a tent over the nail, the sealant forming the tent will be continually stretched and relaxed, a process which over time will break cross-links and make the sealant susceptible to flow away from the nail, thus destroying the air seal.

Sealants according to the present invention comprise cured butyl rubbers present only in the form of a copolymer having a viscosity average molecular weight greater than 100,000 in combination with appropriate tackifiers, in which the tensile strength, elongation and cross-link density of the composition have been adjusted to produce the required sealant characteristics as described above. In general, tensile strength, elongation and cross-link density may most readily be controlled by adjusting the fraction of butyl rubber in the total composition, the amount of cross-linking agent used, the amount of reinforcer used, the molecular weight and degree of mole unsaturation of the butyl rubber, and to a lesser extent the tackifiers and processing methods used. It has been found that preferred sealants for vehicle tires are those in which the tensile strength is in excess of 30 psi, the elongation is in excess of 600%, and the swell ratio in toluene lies between 12 and 40. Furthermore, sealants having elongations in excess of 800% and swell ratios in the range of 12-35 have been found to be particularly suitable as vehicle tire sealants and are especially preferred. Such sealants may be formulated by adjusting the butyl rubber to comprise about 13-40% by weight of the total composition excluding the cross-linking agents, by using a butyl rubber having a mole percent unsaturation between about 0.5 and 2.5 and a molecular weight of about 100,000-450,000, and by using between about 0.5-6 phr of a quinoid cross-linking agent and at least about 2 phr of carbon black. Such sealants having 13-20% butyl rubber, 30-60 phr carbon black and 2-6 phr of a quinoid cross-linking agent are especially preferred because they are readily formulated having properties in the above ranges and because they possess significant processing advantages as described below. Sealants having tensile strengths, elongations, and swell ratios in the ranges set forth above may also be formulated by adjusting the butyl rubber to comprise about 13-50% by weight of the total composition less the cross-linking agents, by using a butyl rubber having a mole % unsaturation between about 0.5-2.5 and a molecular weight of about 100,000-450,000, and by using between about 5-25 phr of a bromomethylated phenolic resin curing agent and at least 3 phr of zinc oxide.

DETAILED DESCRIPTION OF THE INVENTION

Figure 1:
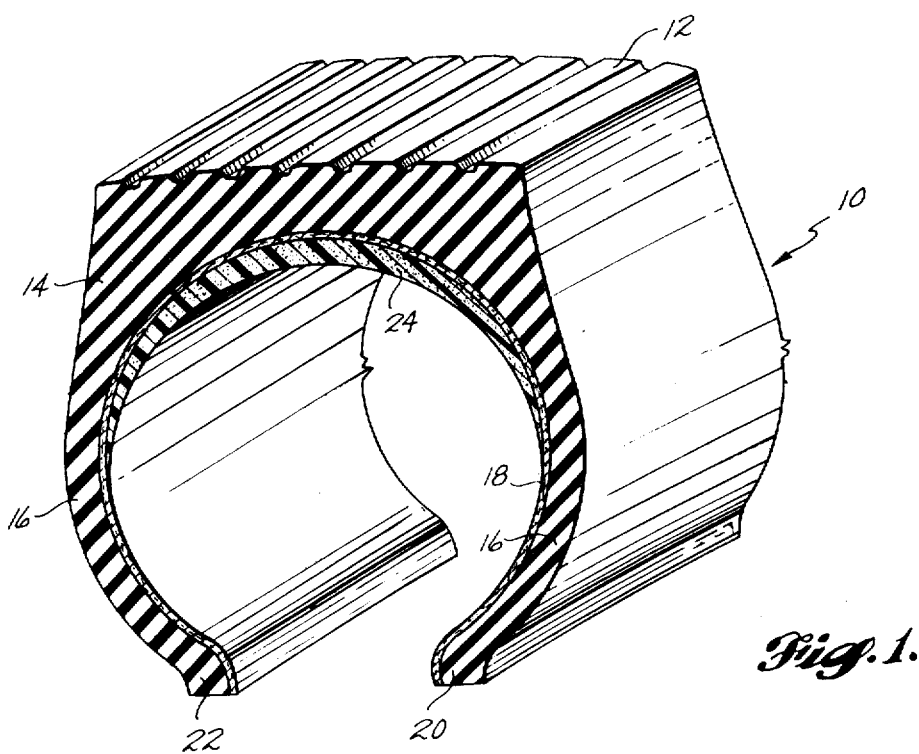
FIG. 1 is a perspective view of a cross-section of a vehicle tire illustrating one embodiment of the invention in which the sealant composition layer is located on the innermost surface of the tire behind the tread.

The copolymer network which provides the strength and continuity of the sealant compositions of the present invention is comprised of cured butyl rubber. Butyl rubber is intended to include copolymers of 96–99.5 wt.% isobutylene and 4–0.5 wt.% isoprene (Butyl IIR) as well as other rubbery copolymers of a major proportion (i.e., over 50% by weight) of an isoolefin having from 4 to 7 carbon atoms with a minor proportion by weight of an open chain conjugated diolefin having from 4 to 8 carbon atoms. The copolymer may consist of from 70 to 99.5% by weight of an isomonoolefin such as isobutylene or ethyl methyl ethylene copolymerized with from 0.5 to 30% by weight of an open chain conjugated diolefin such as isoprene; butadiene-1,3; piperylene; 2,3-dimethyl-butadiene-,3; 1,2-dimethyl-butadiene-1,3 (3-methyl pentadiene-1,3); 1,3-dimethyl butadiene-1,3; 1-ethyl butadiene-1,3 (hexadiene-1,3); 1,4-dimethyl butadiene-1,3 (hexadiene-2,4); the copolymerization being affected by the usual manner of copolymerizing such monomeric materials. "Butyl rubber" as used herein also includes halogenated butyl rubber, of which chlorobutyl and bromobutyl are the best known varieties. The halogen is generally believed to enter the butyl rubber molecule by substitution at the allylic position in the diolefin unit. Typical chlorobutyl rubbers have about 1.0–1.5 weight percent chlorine. "Butyl rubber" also includes those varieties of butyl rubber in which conjugated diene functionality has been added in the linear backbone at the diolefin units. Such conjugated diene butyls are described in U.S. Pat. No. 3,816,371.

The sealant compositions of the present invention may be formulated using any of the standard high molecular weight grades of butyl rubber. Such grades have viscosity average molecular weights in excess of 100,000, and most commonly in the range 300,000–450,000. They are to be distinguished from the low molecular weight butyl grades, which have viscosity average molecular weights on the order of one-tenth of the high weight grades. Sealants of the present invention do not include low molecular weight butyl grades. Representative examples of high weight butyl grades are Butyl 065, Butyl 165, Butyl 268, Butyl 365, Butyl 077, Chlorobutyl 1066 and Chlorobutyl 1068, all available from the Exxon Oil Company, and BUCAR 1000 NS, BUCAR 5000 NS, BUCAR 5000 S and BUCAR 6000 NS, all available from Cities Service Oil Company. While the use of butyl rubber having a molecular weight in excess of about 450,000 will not detract from the sealing qualities of the sealant, such butyl rubber is comparatively difficult to dissolve and combine with other constituents, as well as difficult to apply via an airless spraying technique. Thus the preferred weight range for the high molecular weight butyl rubber is from 100,000 to about 450,000. Furthermore, butyl rubber having molecular weights in the range of 300,000–450,000 having been found particularly useful for formulating sealants having desirable tensile and elongation properties, and are especially preferred.

Cross-linking of the butyl rubber may be effected by any of the well-known curing systems, including sulfur and sulfur containing systems, quinoid systems, and phenolic resin systems. For halogenated butyl, additional useable curing agents include primary amines and diamines, secondary diamines, zinc oxide combined with alkyl dithiol cabamates such as tetramethyl thiuram disulfide, and 1,2–1,3 dialkyl thioureas. For butyl containing conjugated diene functionality, additional useable curing agents include poly-functional dieneophiles, such as ethylene glycol dimethacrylate and trimethylol propane trimethacrylate.

Although butyl rubber may be cured using a vulcanization process (sulfur and accelerators such as mercaptobenzothiazole), such a cure results in a rubber that over time is subject to degradation caused by oxygen or ultraviolet radiation. Such degradation may be partially prevented through the use of antioxidants, such as diphenyl—P—phenylene-diamine, phenylbeta-naphthylamine and hydroquinone, and antiozonants, such as N,N'-di(2-octyl)-p-phenylenediamine and N-(1-3-demethylbutyl)-N'-phenyl-p-phenylenediamine. Nevertheless, the characteristics of the resulting sealant change sufficiently over time to make quinoid and phenolic resin curing systems preferable to vulcanization for the tire sealing applications, where the sealant must be capable of lasting years in a harsh environment.

Quinoid cures depend on cross-linking through the nitroso groups of aromatic nitroso compounds. In the quinoid curing system, p-quinone dioxime and p,p-dibenzoylquinone dioxime are preferred as the curing agents. Other suitable curing agents include dibenzoyl-p-quinone dioxime, p-dinitrosobenzene and N-Methyl-N,4-dinitrosoanilene, the latter two being available on a clay base as "Polyac" from E. I. duPont de Nemours & Co. and as "Elastopar" from Monsanto Chemical Co., respectively. The cross-linking activators which may be employed in the sealant composition include inorganic peroxides, organic peroxides (including diaroyl peroxides, diacyl peroxides and peroxyesters) and polysulfides. Exemplary are lead peroxide, zinc peroxide, barium peroxide, copper peroxide, potassium peroxide, silver peroxide, sodium peroxide, calcium peroxide; metallic peroxyborates, peroxychromates, peroxycolumbates, peroxydicarbonates, peroxydiphosphates, peroxydisulfates, peroxygermanates, peroxymolybdates, peroxynitrates, magnesium peroxide, sodium pryophosphate peroxide, and the like; the organic peroxides such as lauryl peroxide, benzoyl peroxide, 2,4-dichlorobenzoyl peroxide, t-butyl peroxybenzoate, dibenzoyl peroxide, bis (p-monomethoxy-benzoyl) peroxide, p-monomethoxybenzoyl peroxide, bis (p-nitrobenzoyl) peroxide, and phenacetyl peroxide; the metallic polysulfides such as calcium polysulfide, sodium polysulfide, potassium polysulfide, barium polysulfide and the like, some sulfur bearing organic compounds such as disclosed in U.S. Pat. No. 2,619,481, and the organic polysulfides, which possess the general formula R—$(S)_x$—R where R is a hydrocarbon group and x is a number from 2 to 4. The actual cross-linking agent is believed to be the oxidation product of quinone dioxime, p-dinitroso benzene.

The quinoid curing agent/cross-linking activator combination which has been found to result in the shortest gel time is the p-quinone dioxime/benzoyl peroxide combination. The preferred concentration of p-quinone dioxime is 0.5–6 phr. The preferred concentration of benzoyl peroxide is 1.5–18 phr. Accelerators may be employed as appropriate. For example, cobalt napthenate may be used in combination with t-butyl perxybenzoate, and chloranil (2,3,5,6-tetrachloro-1,4-benzoquinone) may be used in combination with t-butyl peroxybenzoate or benzoyl peroxide.

The phenolic resins which may be used as curing agents in this invention include halomethylated alkyl phenolic resins, methylol phenolformaldehyde resins, and related species. Bromomethyl alkyl phenolic resins available from Schenectady Chemicals, Inc. under the tradenames CRJ-328 and SP-1056 are suitable. The preferred concentration of phenolic resin is 5–25 phr. Such resins do not require the use of activators.

The compositions of the present invention include one or more tackifying agents which enable the composition to adhere to the tire, to a puncturing object, and to self-heal over a puncture hole after the puncturing object has been removed. In general, any tackifying agent compatible with a butyl rubber system may be used. Such agents include polybutenes polypropenes, paraffinic oils, petrolatum, phthalates, and a number of resins including polyterpenes, terpene-phenolics, blocked-phenolics, modified rosin and rosin esters, and hydrocarbon resins. Preferred tackifiers are polyisobutylenes and hydrocarbon resins, and particularly combinations thereof.

The sealant compositions of the present invention may include one or more reinforcing agents or fillers. For compositions cured by a quinoid curing system, one of the reinforcing agents must be finely divided carbon. Carbon, such as carbon black, provides reaction sites for the quinoid curing process, and should comprise at least 2 parts of the sealant by weight for each 100 parts of butyl rubber. Preferred concentrations of carbon black are 30–60 phr. The substance comprising the remainder of the reinforcing agent may either be carbon black or some other suitable substance selected on the basis of the desired color of the sealant. For compositions cured by a phenolic resin curing agent, one of the reinforcing agents must be at least 3 phr of zinc oxide. The preferred concentration of zinc oxide is 5–30 phr. Carbon black may also be used with compositions cured by means of phenolic resins, but its presence is not required. Other well-known reinforcing agents and fillers for butyl rubbers include aluminum hydrate, lithopone, whiting, clays, hydrated silicas, calcium silicates, silicoaluminates, magnesium oxide, and magnesium carbonate.

To aid in maintaining sufficient tackiness and thermal stability at elevated temperatures, the sealant compositions of the present invention may include a thermoplastic and elastomeric partially-hydrogenated block copolymer up to about 10 wt.% of the composition, the block copolymer having a general configuration of A-$(B-A)_{1.5}$ wherein prior to hydrogenation each A is a monovinyl arene polymer block and each B is a conjugated diene polymer block. Typical A monomers are styrene, alpha methyl styrene and ring alkylated styrenes. Typical B monomers are butadiene and isoprene. The A blocks make up the end groups and typically comprise about one third of the copolymer by weight, and the B blocks make up the mid groups and the balance of the copolymer. The copolymer is partially hydrogenated so that the conjugated diene block segments are substantially fully saturated. The monovinyl arene polymer block segments are not appreciably saturated. Hydrogenation in this fashion enhances the utility of the block copolymer as an oxidation and high temperature-degradation resistant constituent of the sealant composition. The average molecular weight of the copolymer is in the range of about 60,000 to 400,000. Block copolymers of this type are described in U.S. Pat. No. 3,595,942.

The sealant compositions of the present invention are those comprised of the chemical components described above in which the tensile strength, elongation and cross-link density have been controlled so as to provide the optimum properties for tire sealants. Tensile strength is the stress per unit area that a sample of sealant can withstand before rupturing. As used herein, tensile strength is determined by first curing a sample of the sealant in a thin sheet for 24 hours at room temperature, then at 150° F. for another 24 hours, and then at 190° F. for 4 hours. Dumbell shaped specimens of sealant are then cut using ASTM die "D", and the dimensions of the dumbell shaped specimen are determined. The specimen is then placed in a conventional Dillon tensile testing apparatus having jaws which grip it at its wider end portions, and the specimen is stretched at a cross-head speed of 10 inches per minute until rupture. The tensile strength is the force at rupture divided by the initial cross sectional area of the narrow portion of the specimen.

Elongation, as used herein, is determined by a procedure identical to that for tensile strength. The elongation, expressed as a percentage, is calculated by subtracting the initial length of the specimen from its length at rupture, multiplying by 100, dividing by the initial length, and then if necessary by multiplying the result by a correction factor which compensates for any material which may have been pulled out of the jaws gripping each end of the specimen. The initial and final rupture lengths are determined by measuring the distances between the jaws. Thus the specimen being elongated includes not only the narrow, central portion but also some of the wider end portions of the specimen.

Cross-link density may be measured by performing a swell test on a specimen of the sealant using toluene as a solvent. As is known by those skilled in the art, a swell test provides a reliable and repeatable relative measure of cross-link density. The swell test measures the amount of solvent absorbed by a given amount of cross-linked rubber, and the test results are expressed as a swell ratio of weight of solvent absorbed to weight of cross-linked rubber. The greater the cross-link density of a given specimen of rubber the less the elastomeric network is free to expand by absorbing solvent and the smaller the swell ratio will be. The test herein is performed by weighing a specimen of dry (solventless) sealant, soaking the specimen in toluene for 60-72 hours, removing and weighing the wet specimen, and then drying the specimen at 300° F. for 30 minutes and reweighing. The weight of solvent absorbed is the wet weight less the final dry weight. Soaking the specimen in toluene will remove the ingredients which have not been incorporated into the toluene insoluble polymer network, and the specimen after soaking and drying will therefore essentially include the cross-linked rubber and the carbon black or other fillers if present. In the case where the sealant included a tackifier such as polyisobutylene containing functional end groups, a portion of the tackifier will remain incorporated into the network as side chains as well. The quantity of toluene insolubles present can be calculated from the initial pre-soaking weight of the specimen plus its known composition, and these figures can be subtracted from the dry, post-soaking weight to yield the weight of cross-linked rubber.

The above described tests may readily be carried out by those skilled in the art, and the results of such tests may be used to guide the formulation of sealant composition of the present invention. As previously described, the tensile strength of the sealant must be sufficiently high so that the sealant will not "blow through" a typical puncture hole in the range of tire inflation pressures normally encountered. A reliable guide has been found to be that no more than ½ inch of sealant should extrude through a 0.203 inch diameter hole at 32 psig. The elongation must be sufficiently great so that the sealant will be able to adhere to a puncturing object without capping and be able to flow over and into a puncture hole after the puncturing object is removed. The cross-link density must be sufficiently high such that the sealant will not flow at elevated temperatures (e.g. up to 220° F.) or fatigue when a puncturing object is left in the tire during use. The cross-link density must not be so high, however, as to cause capping of the sealant when a puncturing object enters the tire. A reliable guide as to whether the elongation is sufficiently high and the cross-link density is sufficiently low has been found to be an 80% or higher pass rate in the static puncture test described in Example I below.

It has been found by applicants that preferred tire sealant compositions are those having a tensile strength of at least about 30 psi, an elongation of greater than about 600%, and swell ratios of between about 12 and 40. Within these ranges, compositions of the present invention have been found to have good tire sealing properties, both when the puncturing object remains in the tire and when it is removed, over the entire temperature range to which tire sealants are normally subjected. Furthermore, sealant compositions of the present invention having elongations in excess of 800% and swell ratios in the range of 12-35 have been found to be particularly suitable as vehicle tire sealants, and are especially preferred.

Sealants having tensile strengths, elongations and swell ratios within these ranges may be formulated by including in the compositions of the present invention 13-40% by weight of butyl rubber having a molecular weight greater than about 100,000 and a mole % unsaturation of between about 0.5 and 2.5, and by employing at least 2 phr of carbon black and about 0.5-6 phr of a quinoid cross linking agent. The remainder of such compositions are comprised of appropriate tackifying agents, block copolymers, fillers, pigments, and the like. Compositions having 13-20% butyl rubber have been found to have short gel times and to be readily applicable by spray technique, and are therefore especially preferred. Sealant compositions having tensile strengths, elongations and swell ratios as described above may also be formulated by employing 13-50% by weight of butyl rubber having a molecular weight greater than about 100,000 and a mole % unsaturation of between about 0.5 and 2.5, 5-25 phr of a phenolic resin curing agent, at least 3 phr of zinc oxide, with the remainder of the composition comprising tackifying agents and other modifiers.

The sealant compositions of the present invention may be applied by a variety of means. They may be formulated as sprayable compositions that cure in situ, e.g., on the inner surface of a tire, or as compositions that are first cured in sheet form and then applied. They may also be extruded or brushed onto a substrate. A solvent may be employed in the preparation of the sealant composition. Suitable solvents include hexane, toluene, heptane, naptha, cyclohexanone, trichloroethylene, cyclohexane, methylene chloride, chlorobenzene, ethylene dichloride, 1,1,1-trichloroethane, and tetrahydrofuran, as well as combinations thereof.

Each particular sealant application process will tend to place constraints on the composition of the sealant itself. Thus for example if the sealant is to be solvated and sprayed directly onto a tire, it is desirable to keep the amount of solvent used to a minimum (e.g. 35% or less), so as to simplify solvent recovery procesures and decrease processing time. At solvent levels of 35% or less, however, it has been found that compositions according to the present invention comprising more than about 20% butyl rubber by weight cannot effectively be sprayed by an airless technique by a single fixed nozzle. In airless spray applications, therefore, compositions comprising 20% or less butyl rubber are preferred. Compositions having greater than 20% butyl rubber may be sprayed by a nozzle which tracks back and forth across the tire tread.

A second processing constraint on sealants of the present invention involves cure time. The time required for a given sealant to cure will generally affect throughput regardless of the application process used. It has been found that sealants according to the present invention which are formulated with less than about 2.0 phr of a quinoid cross-linking agent will have gel times which are unacceptably long for many applications. Sealants cured with in excess of about 2.0 phr of quinoid cross linking agent are therefore preferred. Such sealants must also, of course, have values of tensile strength, elongation and cross link density as described above. Since it in general has been found that quinoid cured sealants comprised of more than about 20% butyl rubber will not have adequate elongations unless less than about 2.0 phr of cross-linking agent are used, the practical effect is that preferred quinoid cured sealants are those comprised of no more than about 20% butyl rubber by weight.

Because the sealant compositions described herein have the unique ability to resist oxidation and to remain stable and effective over a wide temperature range, they have numerous applications, such as caulking compounds and as roofing sealants, in addition to their utility as tire sealants. Because the environments to which a tire sealant is subjected is the most severe, the following examples relate the sealant composition to this environment for purposes of illustration. It will be understood that the ratio of the essential ingredients may be varied within the ranges set forth above and that other compounding materials may be replaced by and/or supplemented with such other materials as may be appropriate to deal with the environment contemplated.

With particular respect to the vehicle tire sealant embodiment and with reference to FIG. 1, a vehicle tire 10 conventionally includes a tread portion 12, a carcass portion 14 and side walls 16. In tubeless vehicle tires it is generally desirable to employ a barrier layer or lining 18 which is impermeable to air. The air impermeable lining 18 typically extends over the entire inner surface of the tire 10 from one rim contact portion 20 to the other rim portion 22. In accordance with the embodiment of the present invention illustrated in FIG. 1, a sealant layer 24 is placed on the inside of the tire 10 against the air barrier layer 18. The sealant layer 24 is arranged to lie principally behind the tread 12 of the tire 10 so that the sealant layer will principally serve to seal punctures occurring in the tread portion of the tire.

Figure 2:
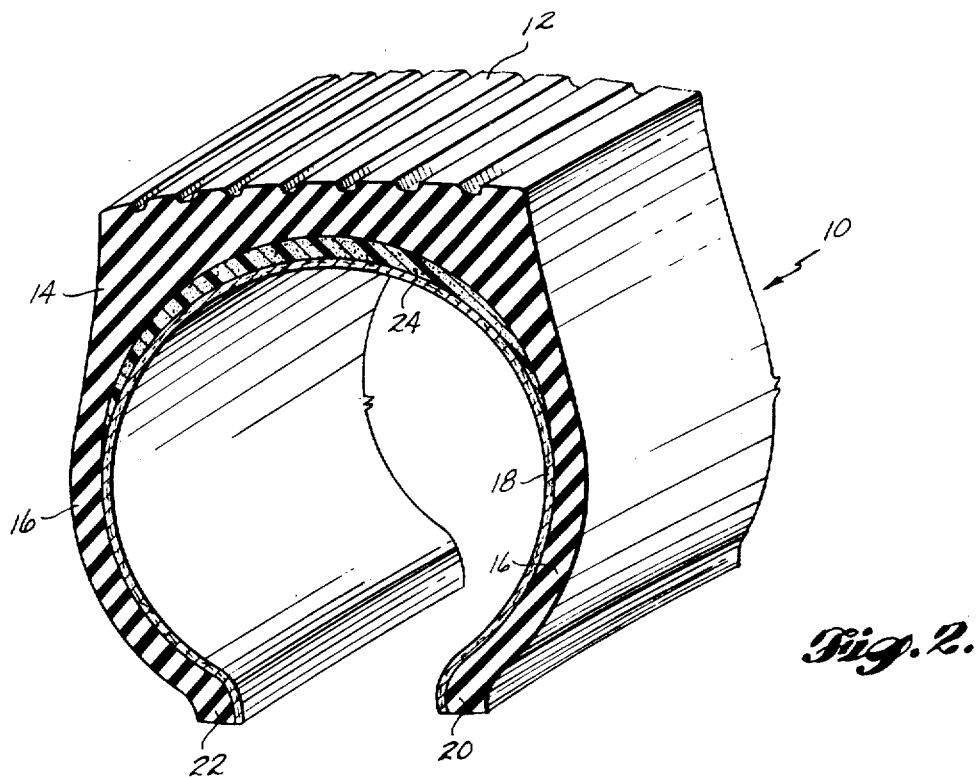
FIG. 2 is a perspective view similar to FIG. 1, illustrating a second embodiment of the invention in which the subject sealant layer is located behind the tread portion of the vehicle tire and between an air impervious film conventionally employed in a tubeless tire and the carcass portion of the tire.

FIG. 2 illustrates another embodiment of the present invention wherein a vehicle tire 10 has parts similar to those illustrated in FIG. 1, and identified by like numerals. However, in this particular embodiment the sealant layer 24 is located between the carcass portion 14 of the tire 10 and the air impermeable barrier layer 18. The vehicle tire embodiment illustrated in FIG. 1 normally occurs when the sealant layer 24 is applied after the tire 10 has been formed and cured. The vehicle tire embodiment illustrated in FIG. 2 occurs when the sealant layer 24 is incorporated into tire 10 when the tire 10 is itself being formed and cured. The sealant layer may be formed and cured at the same time the vehicle tire is being manufactured to realize production economies, since the subject sealant layer can be cured at the temperatures, about 350° F., employed in curing the other rubber components of the tire. When this is done, it is possible to locate the sealant layer in either position as depicted by FIGS. 1 and 2, whereas if the sealant layer is applied after the tire is manufactured, it is only possible to place such a layer inside the air impermeable barrier as illustrated in FIG. 1. Finally, it should be noted if layer 24 is intended to cover the entire inner surface of the tire, the air barrier layer 18 may be eliminated entirely from the vehicle tire construction.

The sealant compositions utilized in the following examples were prepared by combining the ingredients listed in Table 1 in the proportions indicated, all proportions being given by dry weight.

TABLE I

| Ingredient | A | B | C | D | E | F | G | H |
|---|---|---|---|---|---|---|---|---|
| Butyl 165[1] | 15 | — | — | 20 | — | 35 | — | 40 |
| Butyl 365[2] | — | 13 | 20 | — | 10 | — | — | — |
| Butyl 065[3] | — | — | — | — | — | — | 40 | — |
| Vistanex[4] | 10 | 9.78 | 8.98 | 10 | 10 | — | — | — |
| H-100[5] | — | 19.55 | 17.97 | — | 20 | — | — | — |
| H-300[6] | 23 | — | — | 15 | — | 22 | 20 | 50 |
| H-1900[7] | 40 | 43 | 35.05 | 40 | 40 | 32 | 29 | — |
| Piccotac[8] | 5 | 4.89 | 4.49 | 5 | 5 | — | — | — |
| Zinc Oxide | — | — | — | — | — | 10 | 10 | 10 |
| Carbon Black[9] | 7 | 4.89 | 8.98 | 10 | 10 | 1 | 1 | — |
| Block Copolymer[10] | — | 4.89 | 4.49 | — | 5 | — | — | — |
| Para Quinone Dioxime[11] | 3.0 | 3.0 | 2.47 | 3.0 | 3.0 | 0.5 | 1.0 | — |
| Benzoyl Peroxide[11] | 11.0 | 9.0 | 7.41 | 9.0 | 9.0 | 1.5 | 3.0 | — |

TABLE I-continued

| Ingredient | A | B | C | D | E | F | G | H |
|---|---|---|---|---|---|---|---|---|
| CJR-328[11,12] | — | — | — | — | — | — | — | 15 |

[1] A butyl rubber having a viscosity average molecular weight of 350,000 and a mole % unsaturation (isoprone units/100 monomer units) of 1.2, available from Exxon Oil Company under the trademark "Butyl 165".
[2] A butyl rubber having a viscosity average molecular weight of 350,000 and a mole % unsaturation of 2.0, available from Exxon Oil Company under the trademark "Butyl 365".
[3] A butyl rubber having a viscosity average molecular weight of 350,000 and a mole % unsaturation of 0.8, available from Exxon Oil Company under the trademark "Butyl 065".
[4] A polyisobutylene having a viscosity average molecular weight of 55,000, available from Exxon Oil Company under the trademark "Vistanex LM-MS".
[5] A polybutene having an average molecular weight of 920 available from AMOCO under the trademark "H-100".
[6] A polybutene having an average molecular weight of 1290 available from AMOCO under the trademark "H-300".
[7] A polybutene having an average molecular weight of 2300 available from AMOCO under the trademark "H-1900".
[8] A hydrocarbon resin having a softening point of 97° C. available from Hercules, Inc. under the trademark "Piccotac B".
[9] A$_2$ furnace black having a surface area of 235 m$^2$/gm, arithmetic mean particle diameter of 17 millimicrons and a pH of 6.0–9.0 available from Cities Service Oil Company under the trademark "Raven-2000".
[10] A block copolymer having a configuration A-(B-A)$_{1-5}$, A representing a polystyrene block and B representing a hydrogenated polyisoprene block, the isoprene making up about two thirds of the compound by weight, and the average molecular weight being between 70,000 and 150,000. The compound is available from the Shell Oil Company under the trademark "Kraton G-6500".
[11] In parts per 100 parts of butyl rubber.
[12] A dibromethyl octyl phenol having a number average molecular weight of 500 and a bromine content of 28–31%, available from Schenectady Chemicals, Inc. under the trademark "CJR-328".

EXAMPLE I

A tire sealant was prepared according to the formula of composition A above. The butyl rubber, Vistanex, and Piccotac were solvated and blended in hexane so that the mixture contained about 50% solids by weight. The carbon black and the polybutenes were then added to the previously solvated mixture. The p-quinone dioxime was then blended in cyclohexanone to a dilution of about 40% solids by weight, added to the mixture, and dispersed therein to form a first component comprising about 73% solids by weight. This component has been found to have a shelf life of greater than six months.

For a laboratory analysis, a second component was formed by dissolving the benzoyl peroxide in toluene to a dilution of about 3% solids. First and second components were then combined, poured into molds, and then cured for 24 hours at ambient temperature, followed by 24 hours at 150° F. and 4 hours at 190° F. Specimens of the sealant were then tested to determine tensile strength, elongation and swell ratio. Tensile strengths for this sealant were found to lie in the range of 35–45 psi, elongations were in the range of 967–998%, and swell ratios were in the range 17.9–18.5.

New JR-78-15 steel belted radial tires were utilized for evaluating the sealant composition on a tire. The tires were first cleaned by scrubbing their interior surfaces with a wire brush and soap solution. The surfaces were then rinsed and dried. A first component as described above was prepared and a second component was prepared by dissolving the benzoyl peroxide in methylene chloride such that the resultant solution was about 16% solids. The first component was then preheated to 260° F., combined with the second component to yield a mixture having about 66% solids, and sprayed at about 500 psig onto the interior surface of a rotating tire. The temperature of the first and second components after mixing was about 210° F. 1200 grams of sealant on a solvent free basis were sprayed onto each tire, the resulting sealant layer being between 0.2 and 0.25 inches thick under the central portion of the tread and 0.15 inches thick at the tire shoulder. After spraying, the tires were continually rotated for about ten minutes until the sealant had cured sufficiently to resist flow. The tires were then unloaded from the applicator apparatus and placed in an oven at 140° F.–150° F. for 30 minutes.

The coated tires were subjected to a series of tests to evaluate the "on-the-tire" effectiveness of the sealant. These tests included a blow through test, a static puncture test, and a dynamometer test. The blow through test was conducted by drilling six holes in the tire (2 at 0.14 inch diameter, 2 at 0.187 inch diameter, and 2 at 0.203 inch diameter) and plugging the holes with modeling clay prior to sealant application. After application the plugs were removed from the outside, and the tire was inflated to 32 psig at ambient, 42 psig at 180° F., and 46 psig at 220° F. The sealant was considered acceptable if less than about ½ inch of sealant extruded through any hole, and if no loss of air from the tire was detected.

The static puncture test was run at three different temperatures: −20° F.; 70° F.; and 180° F. At each temperature, an 8 penny nail (0.115 inch diameter) and a 20 penny nail (0.180 inch diameter) were inserted in the tire tread in each outside groove and 2 of the center tread grooves. Each nail was deflected 45° in two opposite directions for 1 minute, the nails were removed, and the tire was inflated to 32 psig and tested for leakage. The same procedures were then followed except that the tire was inflated prior to puncturing. Air leaks occuring at any time during this test procedure were recorded.

The dynamometer test is perhaps the most comprehensive test of tire sealant performance, because it simulates actual driving conditions. The test was carried out on a dynamometer comprising a pivot arm having means for rotatably mounting a tire, movable contact means underlying the tire for contacting the tire tread and causing the tire to rotate, and loading means for forcing the pivot arms downward such that the tire is loaded at a predetermined amount against the contact means. The tests were conducted at loads equivalent to 100% of the tires' rated loads. After being coated with sealant as described above and mounted in the dynamometer, the tires were inflated to 24 psi and broken in for two hours at a rotation rate equivalent to 55 mph. The pressure was then adjusted to 30 psi, and eight nails were inserted as in the static puncture test except using 16 penny (0.145 inch diameter) rather than 20 penny nails. The tire was then run again at 55 mph for ten thousand miles or until the pressure dropped below 20 psi, at which point the responsible nail was determined, the nail pulled and patched if necessary, and the test resumed after adjusting the pressure back to 30 psi.

In the blow through test an insignificant amount of sealant was extruded at the holes at ambient temperatures, an average of ⅛ inch extruded at 180° F., and an average of ¼ inch extruded at 220° F. In no cases did the tire lose a measurable amount of air. These test results were good and indicate that the sealant of composition A possesses adequate tensile strength to function as a vehicle tire sealant.

In the static puncture test the composition sealed an average of 89% of the puncture holes without significant air leakage. Table II gives a detailed breakdown:

TABLE II

|  |  | Temperature | | |
| --- | --- | --- | --- | --- |
|  |  | −20° F. | 70° F. | 180° F. |
| Nail Diameter | .115 inches | 93% | 97% | 93% |
|  | .180 inches | 83% | 90% | 77% |

These results show good puncture sealing performance, and demonstrate that the sealant possesses sufficient elongation and sufficiently low cross-link density to enable it to adhere to a puncturing object even when the object is flexed back and forth through an arc of 90°.

In the dynamometer test, the average distance logged by a 16 penny nail before leakage occurred was 4100 miles, and the average distance for an 8 penny nail was 8500 miles. These distances are a significant fraction of the lifetime of an average tire. Furthermore, the dynamometer test as conducted herein represents conditions which are harsher than those encountered in average driving, since the test is run at 100% of a tire's rated load. These average mileages, therefore, represent excellent all-around sealant performance.

EXAMPLE II

Laboratory specimens of composition A were formulated as in Example I except that 4.5 phr of p-quinone dioxime and 16.5 phr of benzoyl peroxide were used. The resulting sealant has a tensile strength of 37 psi, an elongation of 804%, and a swell ratio of 16.2. Increasing the amount of cross-linking agent as expected increased the cross-link density (decreased the swell ratio) but also decreased the elongation to the lower edge of the most preferred range.

EXAMPLE III

Tire sealants were prepared as in Example I for both laboratory and on-the-wire testing according to the formula of composition B above. Toluene was substituted for hexane to facilitate solvation of the block copolymer. The tensile strength, elongation and swell ratios were found to be 34 psi, 987% and 17.83 respectively. In the blow through test, ⅛ inch extruded at 180° F., whereas at 220° F. a leak occurred. These results indicate that the tensile strength of the sealant is near its lower preferred value. In the static puncture test, an average of 98% of all punctures were successfully sealed, indicating that the sealant had good elongation and a cross-link density that was not too high. On the dynamometer, the average mileage for 16 and 8 penny nails was 3200 and 6000 miles respectively.

EXAMPLE IV

Laboratory specimens of composition B were formulated as in Example III except that 5.0 phr of p-quinone dioxime and 15.0 phr of benzoyl peroxide were used. The tensile strength, elongation and swell ratio were found to be 27 psi, 627% and 13.89 respectively. As in Example II, increasing the amount of cross-linking agent increased the cross-link density, but the tensile strength and elongation were simultaneously moved out of their preferred ranges. The low tensile strength of composition B is in general due to the comparatively low amount of butyl rubber present (13%). Examples III and IV indicate below this level of butyl rubber, it will be difficult to compensate for the low rubber content by increasing the cross-link density while at the same time retaining the tensile strength and elongation in the preferred ranges.

EXAMPLE V

A tire sealant for laboratory analysis was prepared as in Example III according to the formula of composition C above. The tensile strength, elongation and swell ratio were 71 psi, 538% and 12.71 respectively. These results indicate that the sealant is too inflexible to provide optimum vehicle tire performance, although it would perform satisfactorily in other, less severe environments. Results also indicate that at the level of 20% butyl rubber using a quinoid curing system, an appreciable amount of adjusting of other factors will be required to bring the sealant properties within their preferred ranges.

EXAMPLE VI

Tire sealants were prepared as in Example I for both laboratory and on-the-tire testing according to the formula of composition D above. The tensile strength, elongation and swell ratio were found to be 67 psi, 670% and 11.86 respectively. The elongation has improved as compared to Example V, but the elongation is still outside the most preferred range. A static puncture test was performed on this composition, and results are indicated in Table III with an average of 64% of the punctures being sealed successfully.

TABLE III

|  |  | Temperature | | |
| --- | --- | --- | --- | --- |
|  |  | −20° F. | 70° F. | 180° F. |
| Nail Diameter | .115 inches | 53% | 60% | 87% |
|  | .180 inches | 60% | 40% | 87% |

As expected based on the elongation test, the composition had the least difficulty sealing punctures at elevated temperatures.

EXAMPLE VII

Laboratory specimens of composition D were formulated as in Example VI except that 2.0 phr of p-quinone dioxime and 6.0 phr of benzoyl peroxide were used. The resulting sealant had a tensile strength of 68 psi, an elongation of 824% and a swell ratio of 13.29. Decreasing the amount of cross linking agent has as expected increased the swell ratio and has also increased the elongation to within the most preferred range. This example illustrates that in general for quinoid cured compositions having a comparatively larger amount of butyl rubber a preferred sealant may in many cases be achieved by reducing the cross-link density until adequate elongations are produced.

EXAMPLE VIII

A tire sealant for laboratory analysis was prepared as in Example III according to the formula of composition E above. The tensile strength, elongation and swell ratio were found to be 14 psi, 754% and 17.69 respectively. The low tensile strength is principally due to the low amount of butyl rubber (10%) present.

EXAMPLE IX

Laboratory specimens of composition E were formulated as in Example VIII except that 5.0 phr of p-quinone dioxime and 15.0 phr of benzoyl peroxide were used. The resulting sealant had a tensile strength of 16 psi, an elongation of 500% and a swell ratio of 12.4. Increasing the amount of cross-linking agent has reduced the swell ratio but has failed by a large margin to increase the tensile strength to within the preferred range. Further the elongation has been decreased. This example illustrates that it will be difficult to formulate a preferred vehicle tire sealant using only 10% butyl rubber. However such sealants may well have uses in other applications, for example as bicycle tire sealants, caulking compounds and the like.

EXAMPLE X

Tire sealants for both laboratory and on-the-tire analysis were prepared using the formula of composition F above. The tensile strength, elongation and swell ratio of the laboratory sample were found to be 51 psi, 1850% and 38.05 respectively. Results of the dynamometer test were average mileage of 3800 miles. However inspection of the tire interiors during the test indicated that flow of sealant had taken place. Such flow is attributable to the comparatively low cross-link density of this sealant. The most preferred sealants are those having swell ratios from 12–35.

EXAMPLE XI

Tire sealants were prepared as in Example X except that 1.2 phr of p-quinone dioxime and 3.6 phr of benzoyl peroxide were used. The tensile strength, elongation and swell ratio of the sealant were 91 psi, 986% and 16.68 respectively. Increasing the amount of cross-linking agent has increased the tensile strength considerably and has reduced the swell ratio to within the preferred range. Dynamometer tests indicated no flow of this sealant. In general, cross-link density (e.g. swell ratio) will be more sensitive to the amount of cross-linker present in compositions such as composition F which include only small amounts of carbon black. Examples X and XI illustrate that a preferred tire sealant can be formed by using 35% butyl rubber and a quinoid curing system if the amount of cross-linking agent and carbon black are sharply reduced. At paraquinone dioxime levels of less than about 2.0 phr, however, the gel time of the sealant becomes quite long. This can be a critical factor in large scale spray application processes, in which the sprayed tires must be kept in the application apparatus and rotating until the sealant has gelled sufficiently to permit handling without flow. It has been found that a gel time of about 10 minutes at 150° F. will permit a reasonable sealant application rate. The gel time of the sealants of Examples X and XI were 22 minutes and 12 minutes respectively at 150° F. These times could be reduced by increasing the amount of p-quinone dioxime used, but as indicated by these examples the result might well be to reduce the elongation outside the preferred range.

EXAMPLE XII

Tire sealants for both laboratory and on-the-tire analyses were prepared as in Example I using the formula of composition G above. The tensile strength, elongation and swell ratio of the laboratory samples were found to be 80 psi, 1197% and 17.54 respectively. The dynamometer tests indicated an average mileage of 3100 miles and no perceptible sealant flow. This example, together with Example XI, illustrates that reducing the mole percent unsaturation of the butyl rubber produces an effect which is opposite to and may partially cancel an increase in the amount of butyl rubber present.

EXAMPLE XIII

Tire sealants for laboratory analysis were prepared in a manner similar to that of Example I using the formula of composition H above. The first component is prepared without the p-quinone dioxime and 6 parts by weight of the CRJ-328 are dispersed in 1 part of toluene to form the second component. The tensile strength, elongation and swell ratio of the laboratory samples were found to be 56 psi, 1790% and 31.14 respectively. This example illustrates that preferred tire sealants can readily be prepared using phenolic resin curing systems.

EXAMPLE XIV

Laboratory specimens of composition H were prepared as in Example XIII, except that 20 phr of the CRJ-328 curing agent were used. The tensile strength, elongation and swell ratio were 44 psi, 1191% and 18.07 respectively. As expected, increasing the amount of curing agent has decreased the elongation and the swell ratio, but their values are still within the preferred ranges.

EXAMPLE XV

Laboratory specimens of composition H were prepared as in Example XIV, except that 10 phr of the CRJ-328 curing agent were used. The tensile strength, elongation and swell ratio were 44 psi, 2875% and 35.71 respectively. Decreasing the amount of curing agent used has increased the elongation and swell ratio to such an extent that the latter is no longer within its most preferred range of 12–35. The swell ratio is less than 40, however, and this composition will perform acceptably as a vehicle tire sealant.

It will be understood that the invention may be embodied in other specific forms without departing from the spirit of central characteristics thereof. The present examples and embodiments, therefore, are to be considered in all respects as illustrative and not restrictive, and the invention is not to be limited to the details thereof but may be modified within the scope of the appended claims.

What is claimed is:

1. A butyl rubber based sealant composition, the butyl rubber constituent of which is present only in the form of a copolymer having a viscosity average molecular weight in excess of 100,000, comprising the reaction product of said butyl rubber, a curing system including a cross-linking agent selected from the group consisting of at least 2 parts by weight of a quinoid cross-linking agent per hundred parts butyl rubber and at least 5 parts by weight of a phenolic cross-linking agent per hundred parts butyl rubber, and at least one tackifier compatible with butyl rubber, and a filler material, the composition being compounded such that it has a tensile strength of at least 30 psi, an elongation of at least 600% and a cross-link density such that its swell ratio in toluene is between 12 and 40.

2. The sealant composition of claim 1, wherein the composition has an elongation of at least 800%, and a cross-link density such that its swell ratio in toluene is between 12 and 35.

3. The sealant composition of claim 2, wherein the cross-linking agent is present in an amount between about 2 and 6 parts by weight for each 100 parts of butyl rubber.

4. The sealant composition of claim 1 wherein the curing agent comprises a quinoid cross-linking agent and wherein the butyl rubber comprises about 13–40% by weight of the composition excluding cross-linking agent and activator and wherein said filler material includes at least 2 parts carbon black per hundred parts butyl rubber.

5. The sealant composition of claim 4 wherein the quinoid curing agent is p-quinone dioxime and wherein the curing system further includes at least parts by weight benzoyl peroxide per hundred parts butyl rubber.

6. The sealant composition of claim 1 wherein the butyl rubber comprises 13–50% of the composition exclusive of the curing system, wherein the curing system comprises a phenolic resin cross-linking agent and wherein said filler material composition includes at least 3 parts zinc oxide per hundred parts butyl rubber.

7. The sealant composition of claim 1 further comprising a filler material composed of at least one of the group consisting of carbon black, zinc oxide, aluminum hydrate, lithapone, whiting, clays, hydrated silicas, calcium silicate, silicoaluminates, magnesium oxide and magnesium carbonate.

8. The sealant composition of claim 1, said constituents being chosen such that the elongation is sufficiently high and the cross-link density is sufficiently low that, when the sealant is applied to the interior of a tire, the tire is punctured by a plurality of nails which are repeatedly deflected for a period of one minute and then withdrawn, and the tire is inflated to 32 psig, the sealant seals at least 80% of the punctures.

9. A butyl rubber based sealant composition, the butyl rubber constituent of which is present in the form of copolymers having a viscosity average molecular weight in excess of 100,000, comprising the reaction product of said butyl rubber, a curing system for said butyl rubber, a tackifier compatible with said butyl rubber and filler material composed of at least one of the group consisting of carbon black, zinc oxide, aluminum hydrate, lithopone, whiting, clays, hydrated silicas, calcium silicate, silicoaluminates, magnesium oxide and magnesium carbonate, the composition being compounded such that it has a tensile strength of at least 30 psi, an elongation of at least 600% and a cross-link density such that its swell ratio in toluene is between 12 and 40.

10. The sealant composition of claim 1 wherein said sealant composition is compounded such that it has an elongation of at least 800% and a cross-link density such that its swell ratio in toluene is between 12 and 35.

11. The sealant of claim 10 wherein the composition is compounded such that when the tire is punctured by a plurality of nails which are repeatedly deflected for a period of one minute and then withdrawn and the tire is inflated to 32 psig, the sealant seals at least 80% of the punctures.

12. The sealant of claim 11 wherein the curing system comprises at least two parts of a quinoid cross-linking agent per hundred parts butyl rubber and an activator for said cross-linking agent, and wherein said filler material includes at least two parts carbon black per hundred parts of butyl rubber.

13. The sealant composition of claim 12 wherein the butyl rubber comprises 13–40% of the composition exclusive of the curing system.

14. The sealant composition of claim 11 wherein the curing system comprises at least 5 phr of a phenolic resin cross-linking agent per hundred parts butyl rubber and wherein said filler material includes at least 3 parts zinc oxide per hundred parts butyl rubber.

15. The sealant composition of claim 12 wherein the butyl rubber comprises 13–50% of the composition exclusive of the curing system.

16. A butyl rubber based sealant composition the butyl rubber constituent of which is present only in the form of copolymers having a viscosity average molecular weight in excess of 100,000 comprising the reaction product of said butyl rubber, a quinoid cross-linking agent for the butyl rubber, a cross-linking activator at least one tackifier compatible with butyl rubber and a filler material, said filler material including at least 2 parts by weight of carbon black per hundred parts butyl rubber, the composition being compounded such that it has a tensile strength of at least 30 psi, an elongation of at least 600% and a cross-link density such that its swell ratio in toluene is between 12 and 40, and such that the elongation is sufficiently high and the cross-link density sufficiently low that, when the sealant is applied to the interior of a tire, the tire is punctured by a plurality of nails which are repeatedly deflected for a period of one minute and then withdrawn, and the tire is inflated to 32 psig, the sealant seals at least 80% of the punctures.

17. The sealant composition of claim 16 wherein said quinoid cross-linking agent is present in an amount not less than 2 parts by weight per hundred parts butyl rubber, and wherein said butyl rubber comprises 13–40% by weight of the sealant composition exclusive of the cross-linking agent and activator.

18. The sealant composition of claim 17 wherein said filler material is composed of at least one of the group consisting of carbon black, zinc oxide, aluminum hydrate, lithopane, whiting, clays, hydrated silicas, calcium silicate, silicaaluminates magnesium oxide and magnesium carbonate.

19. The sealant composition of claim 18 wherein said sealant composition is compounded such that it has an elongation of at least 800% and a cross-link density such that its swell ratio in toluene is between 12 and 35.

* * * * *